United States Patent
Schenk et al.

(10) Patent No.: US 6,701,225 B1
(45) Date of Patent: Mar. 2, 2004

(54) SYSTEM AND METHOD FOR CARRYING OUT AN ELECTRONIC CONTROL OR REGULATION

(75) Inventors: Joachim Schenk, Meinersen-Ohof (DE); Georg Blume, Oppenweiler (DE); Elmar Giehler, Stuttgart-Hausen (DE); Frank Schmidt, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/089,464
(22) PCT Filed: Aug. 2, 2000
(86) PCT No.: PCT/DE00/02547
§ 371 (c)(1),
(2), (4) Date: Jul. 17, 2002
(87) PCT Pub. No.: WO01/23233
PCT Pub. Date: Apr. 5, 2001

(30) Foreign Application Priority Data

Sep. 29, 1999 (DE) .......... 199 46 774

(51) Int. Cl.[7] ................ G05D 1/00
(52) U.S. Cl. ............ 701/1; 701/36; 439/492
(58) Field of Search .......... 701/1, 36; 700/83; 180/287; 439/492, 495

(56) References Cited

U.S. PATENT DOCUMENTS

| | | | |
|---|---|---|---|
| 5,255,962 A | 10/1993 | Neuhaus et al. | 303/188 |
| 5,422,568 A * | 6/1995 | Hashizume et al. | 324/166 |
| 5,895,434 A | 4/1999 | Fennel et al. | 701/48 |
| 6,025,710 A * | 2/2000 | Schneider et al. | 324/173 |

FOREIGN PATENT DOCUMENTS

| | | |
|---|---|---|
| DE | 37 38 915 | 5/1989 |
| DE | 42 03 704 | 8/1993 |
| DE | 44 22 951 | 1/1996 |

OTHER PUBLICATIONS

Wrede J et al: "Brake By Wire For Commercial Vehicles" SAE Transactions, Society of Automotive Engineers, Inc., Warrendale, PA, US, Bd. 101, Nr. 922489, Jan. 1, 1992, pp. 849–859, XP000473008 ISSN: 0096–736X p. 855, paragraph 3.6.

* cited by examiner

Primary Examiner—Marthe Y. Marc-Coleman
(74) Attorney, Agent, or Firm—Kenyon & Kenyon

(57) ABSTRACT

A system for performing an electronic control in open or closed loop, in particular of functions of a motor vehicle, including at least one electronic control unit and at least one actuator and/or sensor assigned to the control unit, the at least one actuator and/or sensor being controllable via a control unit-actuator/sensor interface, in which variant-determining circuit elements which are arranged outside of the control unit, in particular driver modules are provided between the respective interfaces and the actuator and/or sensor.

8 Claims, 4 Drawing Sheets

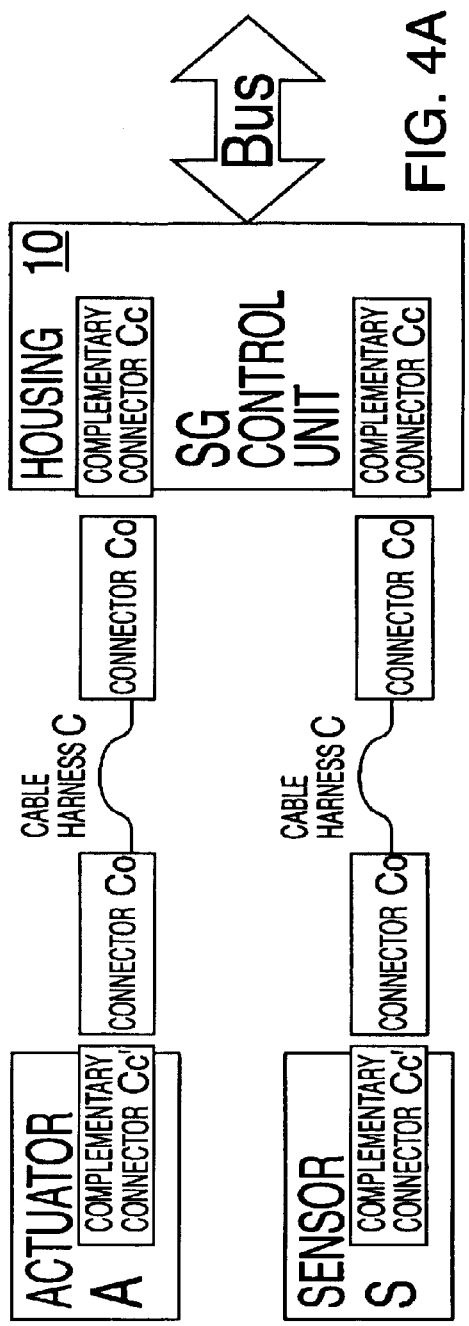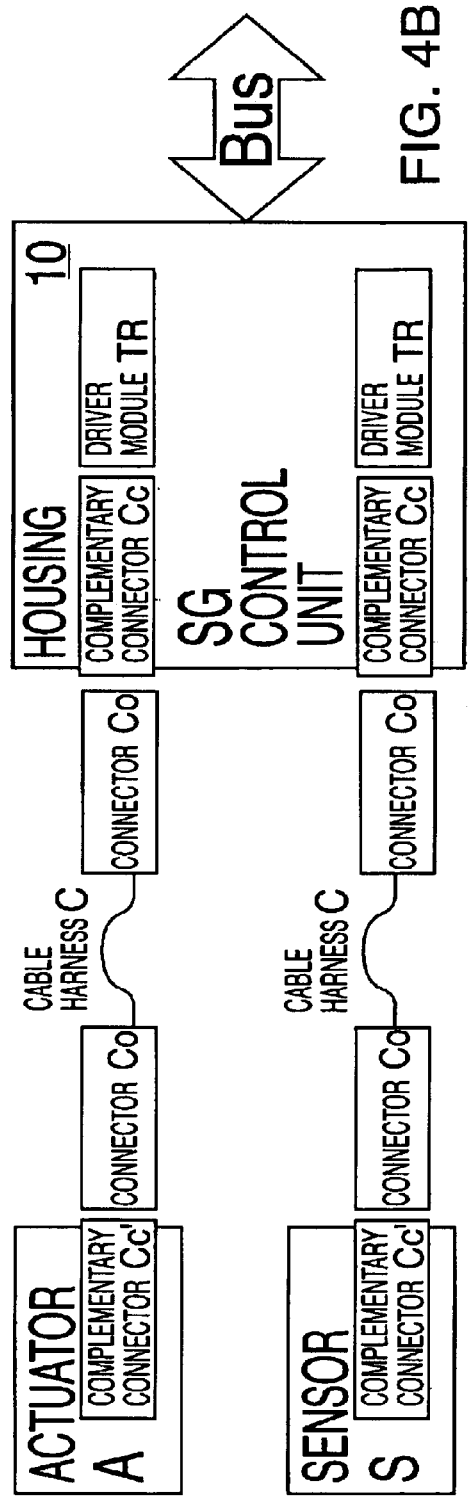

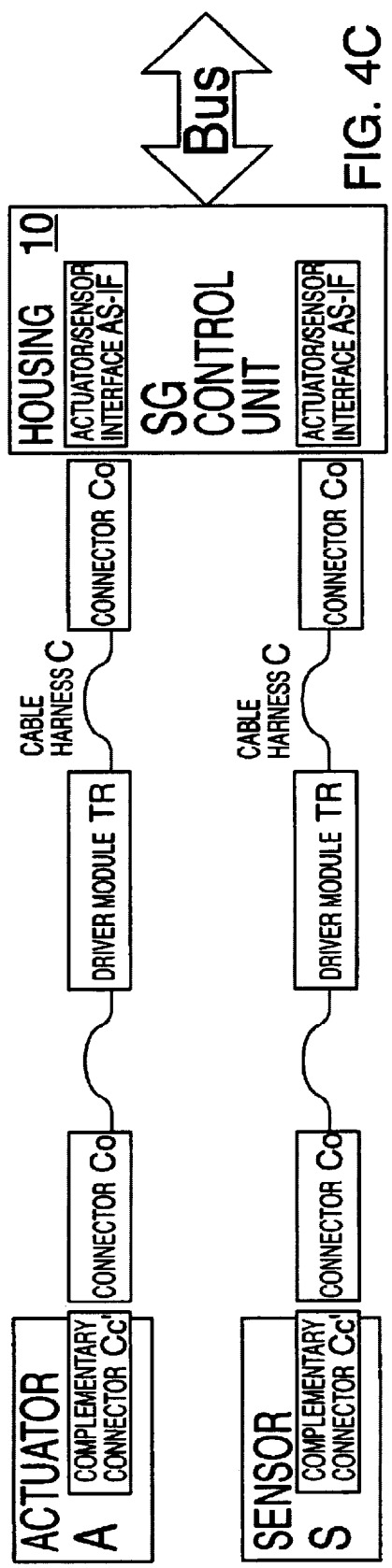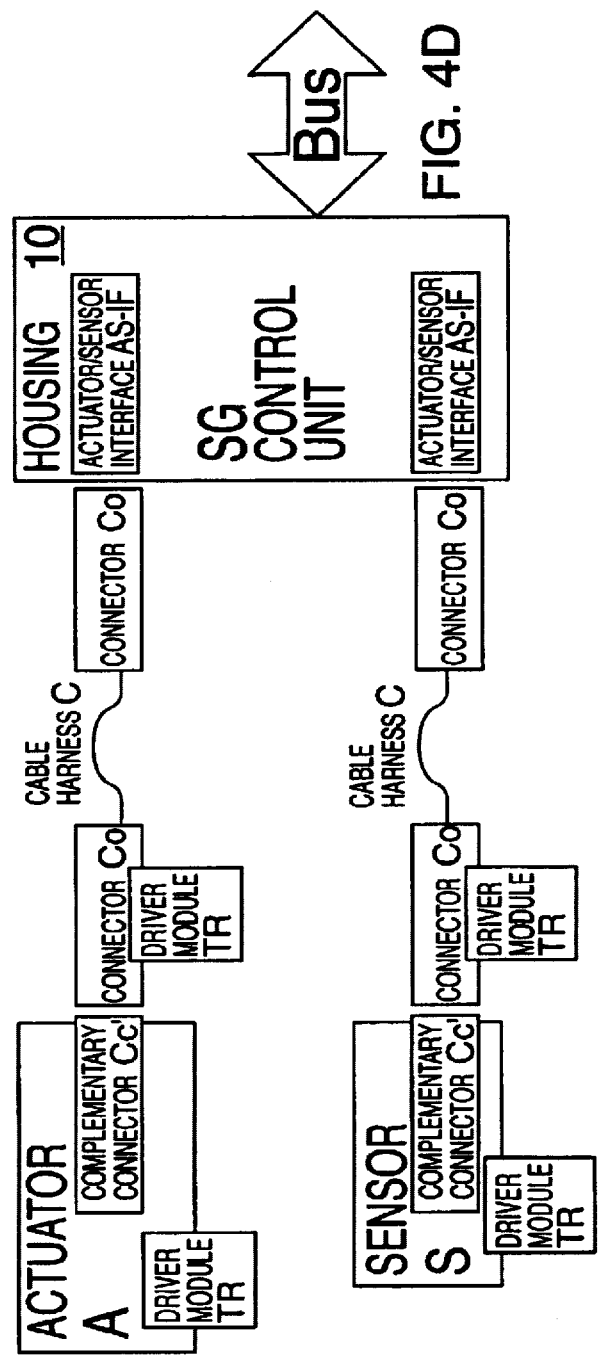

SYSTEM AND METHOD FOR CARRYING OUT AN ELECTRONIC CONTROL OR REGULATION

FIELD OF THE INVENTION

The present invention relates to a system for performing an electronic control in open or closed loop. Moreover, the present invention relates to a corresponding method and a control unit performing an electronic control in open or closed loop.

BACKGROUND INFORMATION

In automotive control, different functions may be performed via different controller arrangements, which each have individually adapted control units. Examples may include anti-lock brake and/or vehicle dynamics control systems. One may endeavor to use universally applicable control units which may be used within the scope of different functions. The individual control units may have connected thereto, for example, suitable actuators and/or sensors which, in turn, may include electronics.

A further example may include a power-window motor with integrated anti-pinch protection electronics. The connection of the actuators or sensors to the respective control units may be accomplished via specific interfaces which may be generally implemented by suitable driver circuits within the control unit. Moreover, control units may contain further components such as microcontrollers, voltage regulators, and memory devices.

A universally usable control unit for control systems is discussed in German Published Patent Application No. 37 38 915. In this context, a universal control unit may be used which may identify the existing system design only after installation because of an external command so as to then store the system design. It may be considered a disadvantage of such a universal control unit that, for ensuring a larger number of control functions, it may need to have correspondingly designed circuit elements and individualized interfaces via which, for example, sensors or actuators may interact with the control unit. The integration of such variant-determining circuit elements and interfaces in one control unit may require a relatively large effort. Due to the potential need for a plurality of connections, moreover, universal control units of that kind may have a relatively large structural size.

German Patent No. 42 03 704 discusses the use of a plurality of control units which communicate via a bus. In this connection, a plurality of control units which may be identical in their hardware design may be installed in a vehicle, their specific functions being determined only from outside, depending their specific use. This publication may relate, in particular, to a method for initializing such control units.

SUMMARY OF THE INVENTION

An object of an exemplary embodiment of the present invention is to provide an electrical system architecture for motor vehicles, in which standardized control units may be largely used, even for implementing different closed-loop and open-loop control functions so as to better ensure in this manner, for example, cost savings and a high flexibility in the use of such control units.

According to the exemplary embodiment and/or exemplary method of the present invention, standard control units may now be used even for implementing complex systems to be controlled, and the standard control units may be individualized for specific control functions using externally arranged, variant-determining circuit elements. A high flexibility may be achieved in the design of vehicle electrics architectures since hardware modification may not be required within a control unit, for example, when changing or replacing an actuator or sensor which may interact with the control unit. In this connection, circuit elements which may be understood to be variant-determining may include, in particular, driver circuits or driver modules which may determine the type of the actuator or sensor which may be connected, respectively.

The control units may be scalable with respect to the number of their interfaces, their computing power and/or their memory capacity. This measure may permit, in a simple manner, for example, adaptation to the control requirements of a small car which may require about twenty control inputs or outputs, or to those of a more complex vehicle in which about eighty such inputs or outputs may be needed.

In an exemplary embodiment of the system according to the present invention, the interfaces may have a standardized section which may be formed in or on the control unit and an individualized section which may be formed such that it may be externally arranged with respect to the control unit. Using this measure, an essentially completely standardized control unit may be provided which may be individualized by connection to suitable individualized interface sections or variant-determining circuit elements such as power drivers, etc.

In another exemplary embodiment of the system according to the present invention, the individualized section of the respective interfaces and/or the variant-determining circuit element may be arranged within a cable harness which may connect the control unit with an actuator or sensor. This measure may permit use of individualized cable harnesses for adapting a control unit to actuators or sensors as a result of which the effort for making available the actual control unit may be reduced.

According to another exemplary embodiment, the individualized section of the interfaces may be expediently provided in or on a sensor or actuator. For this purpose, the sensor or actuator may include corresponding plugs.

In another exemplary embodiment of the system according to the present invention, provision may be made for at least two control units which may be interconnected via a multiplex line. Via such a multiplex line, different control units may be interconnected in a simple and effective manner.

BRIEF DESCRIPTION OF THE DRAWINGS

FIGS. 4A–4D are block diagrams for explaining the exemplary system of the present invention in comparison to other systems.

DETAILED DESCRIPTION

Figure 1:
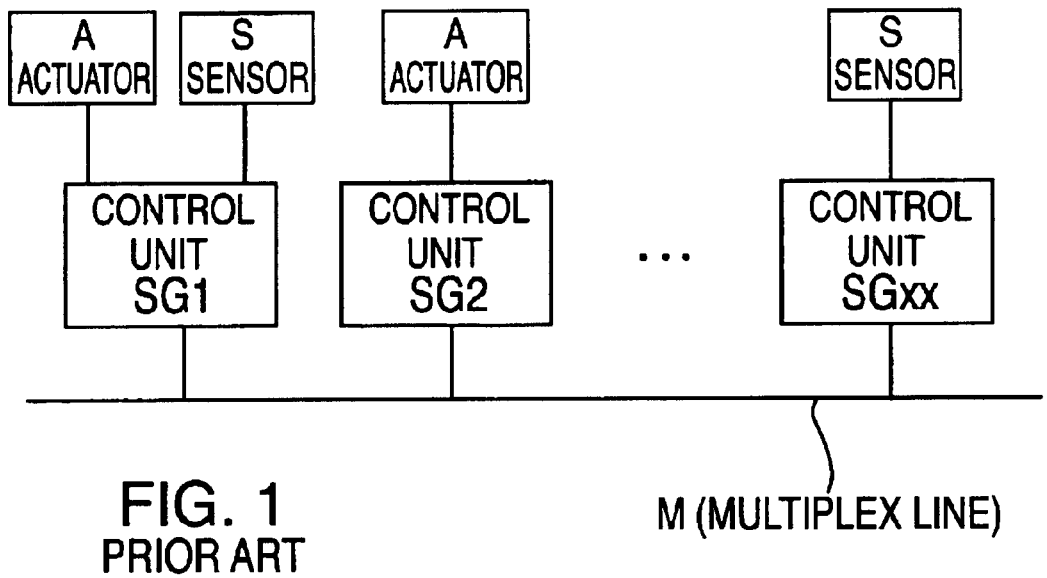
FIG. 1 is a block-diagram for explaining a vehicle electrics architecture that may be presently used.

FIG. 1, is a schematic representation of a vehicle electrics architecture as may be used at present. In this connection, provision is made for different control units SG1, SG2, SGxx which each interact with actuators or sensors which are denoted by A or S, respectively. The actuators and sensors as well as the control units in each case assigned thereto may be used for implementing different on-board functions. In recent vehicle generations, these control units may be interconnected via a suitable multiplex system or a multiplex line M.

Figure 2:
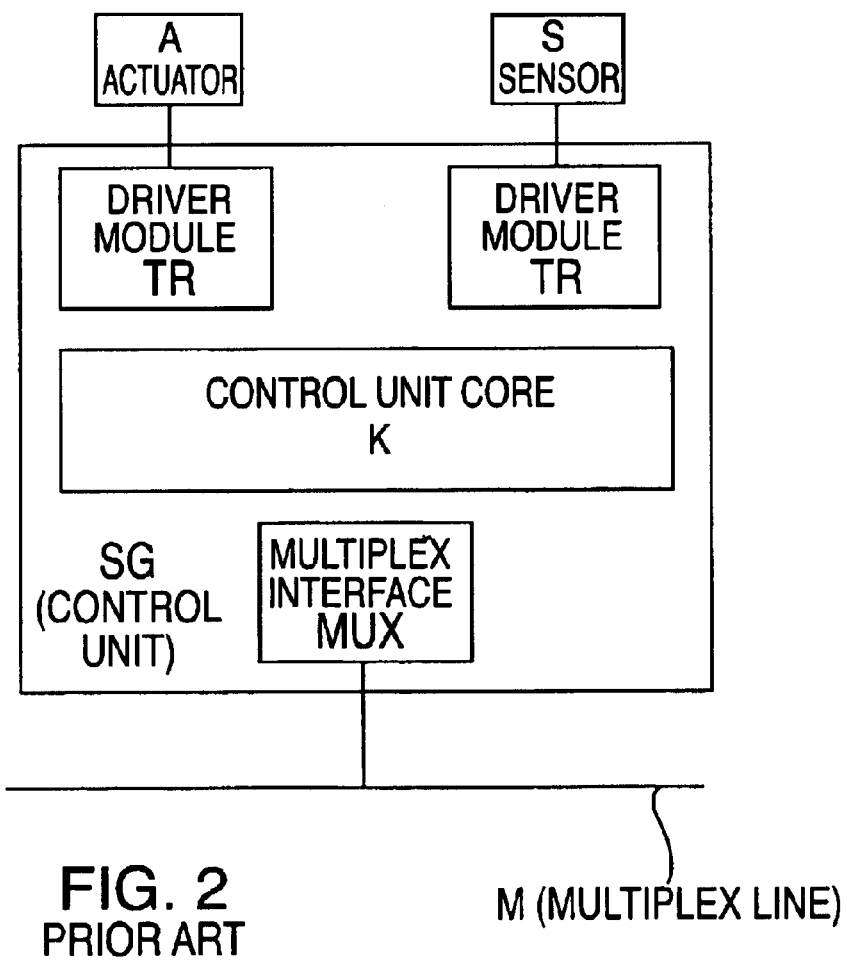
FIG. 2 shows a block-diagram of another vehicle electrics architecture that may be presently used.

The actuators and/or sensors A, S, in turn, may contain electronics; for example, a power-window motor with integrated anti-pinch protection electronics. The connection of the actuators or sensors to the respective control units SG is accomplished via specific interfaces which may be implemented by suitable driver modules TR within the control unit, as shown in FIG. 2. FIG. 2 shows the overall inner design of a control unit SG. In addition to the mentioned driver modules TR, a control unit core K and a multiplex interface MUX are discernible. Control unit core K includes, for example, a microcontroller, a voltage regulator, and a memory device.

Figure 3:
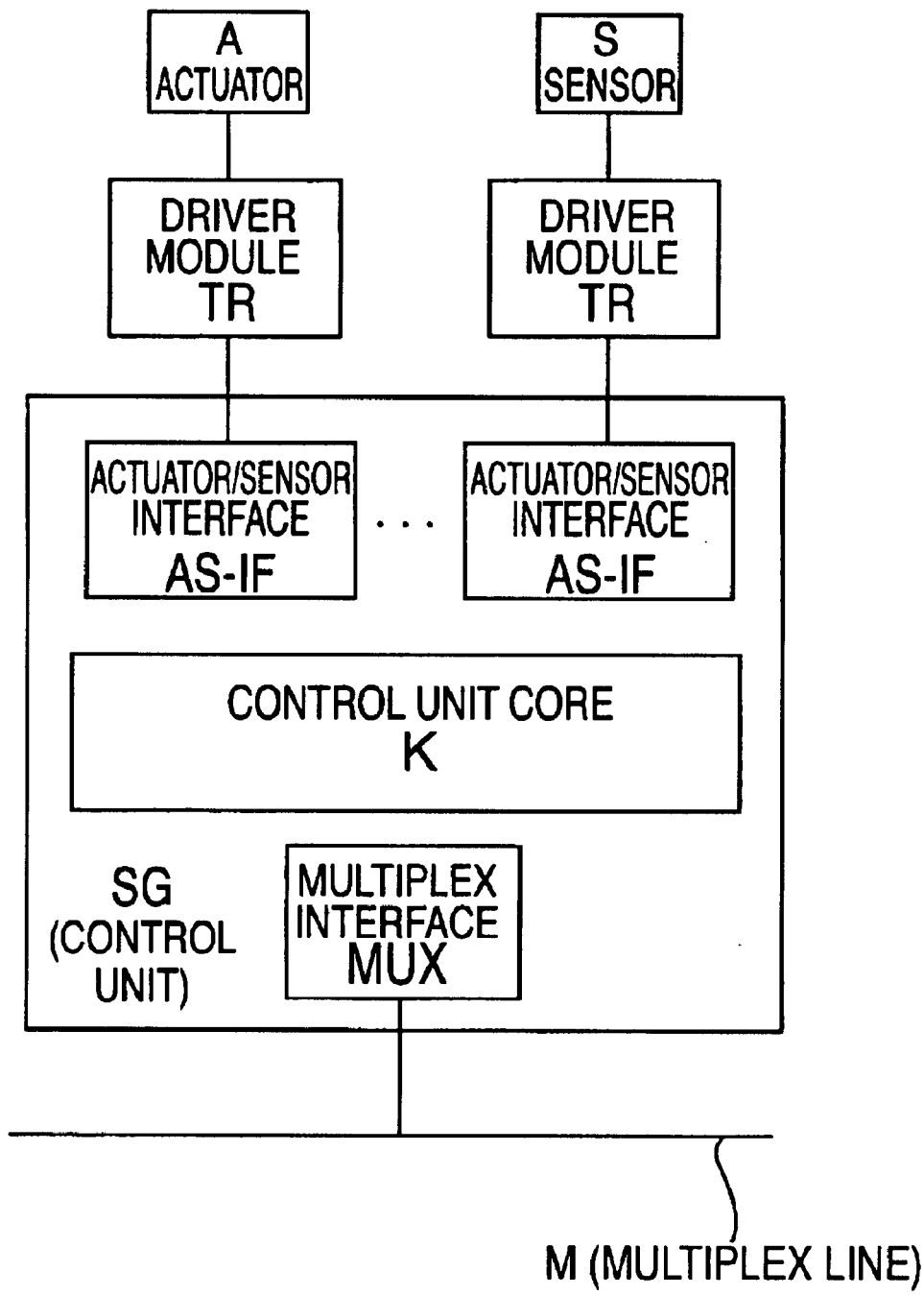
FIG. 3 is a block-diagram of an exemplary system according to the present invention.

FIG. 3 shows an exemplary embodiment of a control unit which may be used within the scope of the system according to the present invention. Components which are identical or similar to those that have already been introduced with reference to the related art are denoted by identical reference characters.

In contrast to the control unit shown in FIG. 2, the variant-determining circuit elements, that is, driver modules TR arranged between control unit and actuator or sensor, are arranged outside of control unit SG. In this context, driver modules TR are each connected to control unit SG via an actuator/sensor interface AS-IF. If driver modules TR and interfaces AS-IF as a whole are considered to be interfaces between an actuator or sensor and the control unit, driver module TR constitutes in each case a variant-determining, that is, individualized interface section and interface AS-IF represents a standardized interface section.

Control unit SG may be scalable with respect to the number of interfaces as well as to its computing power and its memory capacity, etc.

On the basis of the representation of FIGS. 4A–4D, exemplary embodiments of the system according to the present invention are again contrasted with other systems that may be presently used. Moreover, an exemplary method according to the present invention is explained with reference to these Figures.

FIG. 4A shows a system that may be presently used for performing an electronic control in open or closed loop. In this connection, a control unit SG is implemented on a printed-circuit board (not specifically shown) inside a standard housing 10. Control unit SG includes drivers, which are not specifically shown. In accordance with this system, the drivers are implemented by suitable circuits on the printed-circuit board. The drivers which are integrated within control unit SG are connected with an actuator A or a sensor S via respective cables or cable harnesses C. In this context, cable harnesses C are designed with connectors Co at their respective ends, the connectors co-operating, on the one side, with the drivers (via complementary connectors Cc) and, on the other side, with actuator A or sensor S (via complementary connectors Cc'). The double arrow indicates that further control units SG may be connected to the shown control unit via a suitable bus.

FIG. 4B is a schematic representation of a first step for standardizing the system by forming circuit modules. That is, driver circuits have a modular-like arrangement (represented by driver modules TR) and, together with the corresponding complementary connectors Cc for the connectors Co of the cable harnesses, form interfaces of control unit SG for actuator A or sensor S.

In FIG. 4C, a first exemplary embodiment of the system according to the present invention is shown schematically. The variant-determining circuit elements, that is, driver modules TR, are externally arranged with respect to control unit SG in the respective cable harnesses C between control unit and actuator or sensor. Only interfaces AS-IF as well as the control unit core (not shown here) remain in control unit SG (see also FIG. 2).

For the connection of actuator A or of sensor S to control unit SG, cable harnesses C, which each are designed with a driver module TR, are in turn formed with corresponding connectors Co.

In FIG. 4D, a further exemplary embodiment of the system according to the present invention is shown. Here too, driver modules TR are externally arranged with respect to control unit SG in a similar manner as in the exemplary embodiment described immediately above. According to this exemplary embodiment, driver modules TR are formed within connectors Co on the sensor or actuator side and/or within sensor S or actuator A. This exemplary embodiment includes in each case two driver modules TR both for the actuator and the sensor is specified only by example. An exemplary embodiment of that kind may be implemented, for example, by providing only a part of the driver module both in the actuator or sensor and in each case in the assigned connector Co, respectively. According to another variation (not shown) of this exemplary embodiment, such a driver module may be provided exclusively in the actuator or sensor or also exclusively in connector Co on the actuator or sensor side.

The exemplary method according to the present invention is shown with reference to FIG. 4D. Via sensor S, a measurable variable is received and converted into a sensor signal. Via driver module TR which serves as interface and is integrated within the sensor and/or connector Co on the sensor side, the sensor signal is transmitted to control unit SG by way of a cable harness C. Control unit SG computes a control signal for driving actuator A on the basis of the sensor signal. This control signal is transmitted to actuator A via a further cable harness C and driver module TR which serves as control unit/actuator interface and which may be integrated within the actuator or connector Co on the actuator side. On the basis of this control signal, the actuator actuates a functional unit assigned thereto.

Finally, the exemplary embodiments and/or exemplary methods of the present invention may be used both within the scope of body electronics and within the scope of electronic engine or brake control in open or closed loop. Further fields of application which are not specifically mentioned here may also involve appropriate applications.

What is claimed is:

1. A system for electronically controlling in one of an open loop and a closed loop a motor vehicle function, the system comprising:
   at least one electronic control unit;
   at least one of an actuator and a sensor assigned to the at least one electronic control unit; and
   an interface to interface the at least one electronic control unit and the at least one of the actuator and the sensor, the interface including a standardized section arranged at the at least one electronic control unit, and an individualized section arranged externally with respect to the at least one electronic control unit, wherein a section is arranged between the standardized section and the at least one of the actuator and the sensor and is a variant determining circuit element that is operable as a driver element, and wherein the at least one of the actuator and the sensor is controllable by the interface.

2. The system according to claim 1, wherein the at least one electronic control unit is scalable with respect to at least one of a number of interfaces, a computing power, and a memory capacity.

3. The system according to claim 1, further comprising:
a cable harness to connect the at least one electronic control unit with the at least one of the actuator and the sensor, wherein at least one of the individualized section and the variant determining element is arranged within the cable harness.

4. The system according to claim 1, wherein the individualized section is arranged one of in and on the at least one of the actuator and the sensor.

5. The system according to claim 1, further comprising:
a multiplex line to interconnect at least two electronic control units.

6. A method for electronically controlling in one of an open loop and a closed loop a motor vehicle function, the method comprising:
providing a sensor signal via at least one sensor;
processing the sensor signal via at least one electronic control unit to obtain a control signal; and
acting upon at least one actuator based on the control signal;
wherein the steps are performed in a system that includes:
the at least one electronic control unit,
the at least one actuator and the at least one sensor, which are assigned to the at least one electronic control unit, and
an interface to interface the at least one electronic control unit and the at least one actuator and the at least one sensor, the interface including a standardized section arranged at the at least one electronic control unit, and an individualized section arranged externally with respect to the at least one electronic control unit, wherein a section is arranged between the standardized section and the at least one actuator and the at least one sensor and is a variant determining circuit element that is operable as a driver element, and wherein the at least one actuator and the at least one sensor is controllable by the interface.

7. A control unit for performing an electronic control in one of an open loop and a closed loop for a motor vehicle function, the control unit comprising:
at least one standardized interface arranged to connect a variant-determining circuit element, which is operable as a driver module, to act upon at least one of an actuator and a sensor;
wherein the at least one standardized interface is a component of an interface, the interface being operable to interface the at least one electronic control unit and the at least one of the actuator and the sensor, the interface including a standardized section arranged at the at least one electronic control unit, and an individualized section arranged externally with respect to the at least one electronic control unit, wherein a section is arranged between the standardized section and the at least one of the actuator and the sensor and is a variant determining circuit element that is operable as a driver element, and wherein the at least one of the actuator and the sensor is controllable by the interface.

8. A control unit for performing an electronic control in one of an open loop and a closed loop for a motor vehicle function, the control unit comprising:
at least one standardized interface arranged to connect a variant-determining circuit element, which is operable as a driver module, to act upon at least one of an actuator and a sensor;
wherein the at least one standardized interface is used with a method that includes:
providing a sensor signal via at least one sensor,
processing the sensor signal via at least one electronic control unit to obtain a control signal, and
acting upon at least one actuator based on the control signal; wherein the steps are performed in a system that includes:
the at least one electronic control unit,
the at least one actuator and the at least one sensor, which are assigned to the at least one electronic control unit, and
an interface to interface the at least one electronic control unit and the at least one actuator and the at least one sensor, the interface including a standardized section arranged at the at least one electronic control unit, and an individualized section arranged externally with respect to the at least one electronic control unit, wherein a section is arranged between the standardized section and the at least one actuator and the at least one sensor and is a variant determining circuit element that is operable as a driver element, and wherein the at least one actuator and the at least one sensor is controllable by the interface, the at least one standardized interface being a component of the interface.

* * * * *